(12) United States Patent
Storey

(10) Patent No.: US 11,277,976 B2
(45) Date of Patent: Mar. 22, 2022

(54) GREENWALL CLADDING

(71) Applicant: University of Wyoming, Laramie, WY (US)

(72) Inventor: Nathaniel R. Storey, Laramie, WY (US)

(73) Assignee: UNIVERSITY OF WYOMING, Laramie, WY (US)

(*) Notice: Subject to any disclaimer, the term of this patent is extended or adjusted under 35 U.S.C. 154(b) by 56 days.

(21) Appl. No.: 16/829,759

(22) Filed: Mar. 25, 2020

(65) Prior Publication Data

US 2020/0221647 A1 Jul. 16, 2020

Related U.S. Application Data

(62) Division of application No. 15/513,984, filed as application No. PCT/US2015/052166 on Sep. 25, 2015, now Pat. No. 10,602,674.

(Continued)

(51) Int. Cl.

| | |
|---|---|
| *A01G 31/00* | (2018.01) |
| *A01G 31/06* | (2006.01) |
| *A01G 9/02* | (2018.01) |
| *A01G 9/04* | (2006.01) |
| *A01G 24/20* | (2018.01) |
| *A01G 24/30* | (2018.01) |
| *A01G 25/02* | (2006.01) |

(Continued)

(52) U.S. Cl.
CPC ............. *A01G 9/025* (2013.01); *A01G 9/047* (2013.01); *A01G 24/20* (2018.02); *A01G 24/30* (2018.02); *A01G 25/02* (2013.01); *A01G 31/00* (2013.01); *A01G 31/02* (2013.01); *A01G 31/06* (2013.01); *E04C 1/395* (2013.01); *A01G 24/18* (2018.02); *A01G 24/48* (2018.02); *A01G 2025/006* (2013.01); *Y02P 60/20* (2015.11)

(58) Field of Classification Search
CPC .......... A01G 9/047; A01G 9/24; A01G 9/247; A01G 31/00; A01G 31/06
USPC ................ 47/59 R, 60, 62 R, 63, 64, 79, 82
See application file for complete search history.

(56) References Cited

U.S. PATENT DOCUMENTS

| | | |
|---|---|---|
| 2,152,869 A | 4/1939 | Campbell |
| 2,292,619 A | 8/1942 | De |

(Continued)

FOREIGN PATENT DOCUMENTS

| | | |
|---|---|---|
| CA | 2284389 C | 2/2004 |
| EP | 2030503 A1 | 3/2009 |

(Continued)

OTHER PUBLICATIONS

"Assembling a Vertical Hydroponics System," Bright Agrotech, Upstart University, https://www.slideshare.net/BrightAgrotech/greenwall-assembly-instructions-v1, Jun. 3, 2014, 28 slides.

(Continued)

*Primary Examiner* — David J Parsley
(74) *Attorney, Agent, or Firm* — Weatherly IP Solutions, LLC; James Weatherly

(57) ABSTRACT

A greenwall cladding system for the growth of organisms such as plants and fungi on the side of structures, such as internal and external walls of buildings, is provided. Methods for the production of organisms on a greenwall cladding system, such as plants and fungi are also provided herein.

19 Claims, 6 Drawing Sheets

Related U.S. Application Data

(60) Provisional application No. 62/057,328, filed on Sep. 30, 2014.

(51) Int. Cl.
  *A01G 31/02*   (2006.01)
  *E04C 1/39*   (2006.01)
  *A01G 24/48*   (2018.01)
  *A01G 24/18*   (2018.01)
  *A01G 25/00*   (2006.01)

(56) References Cited

U.S. PATENT DOCUMENTS

| | | |
|---|---|---|
| 3,018,586 A | 1/1962 | Lane |
| 3,368,303 A | 2/1968 | Duncan |
| 4,035,950 A | 7/1977 | Anselm |
| 4,070,793 A | 1/1978 | Dillon |
| 4,095,608 A | 6/1978 | Holmes |
| 4,175,355 A | 11/1979 | Dedolph |
| 4,216,617 A | 8/1980 | Schmidt |
| 4,310,990 A | 1/1982 | Payne |
| 4,454,684 A | 6/1984 | O'Hare |
| 4,566,607 A | 1/1986 | Smith |
| 4,932,158 A | 6/1990 | Roberts |
| 4,972,627 A | 11/1990 | Hori et al. |
| 5,097,627 A | 3/1992 | Roberts |
| 5,161,327 A | 11/1992 | Campbell et al. |
| 5,293,713 A | 3/1994 | Ahmed |
| 5,363,594 A | 11/1994 | Davis |
| 5,490,374 A | 2/1996 | Calande |
| 5,555,676 A | 9/1996 | Lund |
| 5,826,375 A | 10/1998 | Black |
| 5,987,812 A | 11/1999 | Knell |
| D420,554 S | 2/2000 | Evans |
| 6,615,542 B2 | 9/2003 | Ware |
| 6,725,601 B2 | 4/2004 | Chick |
| 6,751,903 B2 | 6/2004 | Shryock |
| 6,840,007 B2 | 1/2005 | Leduc et al. |
| 6,840,008 B1 | 1/2005 | Bullock et al. |
| 6,951,076 B2 | 10/2005 | Winsbury |
| 7,188,451 B2 | 3/2007 | Marchildon |
| 7,788,848 B1 | 9/2010 | Koumoudis |
| 7,921,599 B2 | 4/2011 | Irwin |
| 8,122,642 B1 | 2/2012 | Huberman et al. |
| 8,281,517 B2 * | 10/2012 | MacKenzie ............ A01G 9/025 47/83 |
| 8,327,582 B2 | 12/2012 | Storey |
| 8,438,781 B2 | 5/2013 | Zhao et al. |
| 8,950,112 B2 * | 2/2015 | dos Santos .......... A01G 27/005 47/82 |
| 8,966,815 B1 | 3/2015 | Smiles |
| 8,984,808 B2 | 3/2015 | Daniels et al. |
| 9,131,646 B2 * | 9/2015 | Sung ..................... A01G 9/025 |
| 9,226,457 B2 | 1/2016 | Laurence et al. |
| 9,374,947 B2 | 6/2016 | Meyer |
| 9,380,751 B2 | 7/2016 | Storey |
| 9,491,915 B2 | 11/2016 | Storey |
| D785,497 S | 5/2017 | Storey |
| D796,378 S | 9/2017 | Storey |
| D821,915 S | 7/2018 | Storey |
| D826,769 S | 8/2018 | Storey |
| D832,738 S | 11/2018 | Storey |
| 2001/0047617 A1 | 12/2001 | Blossom |
| 2003/0052398 A1 | 3/2003 | Utsumi |
| 2003/0089037 A1 | 5/2003 | Ware |
| 2003/0101645 A1 | 6/2003 | Cole et al. |
| 2004/0020114 A1 | 2/2004 | Boehmer et al. |
| 2004/0103583 A1 | 6/2004 | Eriksen et al. |
| 2004/0200148 A1 | 10/2004 | Schuck et al. |
| 2005/0055878 A1 | 3/2005 | Dumont |
| 2005/0055879 A1 | 3/2005 | Darlington |
| 2006/0032128 A1 | 2/2006 | Bryan |
| 2006/0107589 A1 | 5/2006 | Rubin |
| 2006/0117656 A1 | 6/2006 | Graham et al. |
| 2006/0150485 A1 | 7/2006 | Somerville |
| 2006/0156624 A1 | 7/2006 | Roy et al. |
| 2006/0236604 A1 | 10/2006 | Hesse et al. |
| 2007/0062113 A1 | 3/2007 | Rubin et al. |
| 2007/0214717 A1 | 9/2007 | Larwood |
| 2008/0034653 A1 | 2/2008 | Ramsey et al. |
| 2008/0209804 A1 | 9/2008 | Stradiot |
| 2008/0295402 A1 | 12/2008 | Bindschedler et al. |
| 2009/0056221 A1 | 3/2009 | Ramsey et al. |
| 2009/0223126 A1 | 9/2009 | Gamer et al. |
| 2009/0288341 A1 | 11/2009 | Kania et al. |
| 2010/0095584 A1 | 4/2010 | Huet et al. |
| 2011/0016782 A1 | 1/2011 | Harder |
| 2011/0016784 A1 | 1/2011 | Taber |
| 2011/0232188 A1 | 9/2011 | Kennedy |
| 2012/0000128 A1 | 1/2012 | Rochefort |
| 2012/0066972 A1 | 3/2012 | Lin |
| 2013/0219788 A1 | 8/2013 | VanLente |
| 2013/0340337 A1 | 12/2013 | Kuo et al. |
| 2014/0020292 A1 | 1/2014 | Mcnamara et al. |
| 2014/0115960 A1 | 5/2014 | Kantola et al. |
| 2014/0259904 A1 | 9/2014 | Collard |
| 2015/0342127 A1 | 12/2015 | Gallant |

FOREIGN PATENT DOCUMENTS

| | | |
|---|---|---|
| GB | 2265536 A | 10/1993 |
| GB | 2343829 B | 11/2003 |
| JP | S56154961 A | 11/1981 |
| JP | H0614665 A | 1/1994 |
| JP | 2014212701 A | 11/2014 |
| WO | 2005025299 A1 | 3/2005 |
| WO | 2015175415 A1 | 11/2015 |

OTHER PUBLICATIONS

Horton, Robin, "Vertical Farming on Rise for Urban Food Supply", Urban Gardens, Jul. 9, 2010, 5 pages.

Idowning, Lois, "Planning and Building Green Walls," https://blog.brightagrotech.com/planning-and-building-green-walls/, Aug. 20, 2013, 10 pages.

International Search Report, PCT/US15/52166, dated Dec. 21, 2015.

Michael, Chris, "What is a Living Green Wall?," https://blog.brightagrotech.com/what-is-a-living-green-wall/, Aug. 28, 2014, 9 pages.

Michael, Chris, "ZipGrow Living Green Walls at ASLA 2014," https://blog.brightagrotech.com/zipgrow-living-green-walls-asla-2014/, Nov. 20, 2014, 9 pages.

Peters, Adele, "These Vertical Farms Turn Unused City Wall Space Into Gardens That Grow Your Lunch," Fast Company, https://www.fastcompany.com/3052538/these-vertical-farms-turn-unused-city-wall-space-into-gardens-that-grow-your-lunch, Oct. 23, 2015, 6 pages.

Sam, "Green Wall Update (Frozen in Time)—Nov. 10, 2014," Bright Agrotech, https://youtu.be/kraa_d3ddRg, Nov. 11, 2014, 2:07 minutes, 1 page.

Sam, "How Do Living Green Walls Work?," Bright Agrotech, https://youtu.be/LdBDtP1mcxU, Sep. 19, 2014, 2:49 minutes, 1 page.

Sam, "Laramie Green Wall Update Snow Edition (Nov. 3, 2014)," Bright Agrotech, https://youtu.be/zvjTgSVX5s4, Nov. 3, 2014, 1:10 minutes, 1 page.

Sam, "September Green Wall Update," Bright Agrotech, https://youtu.be/VmVhoBAd6KU, Sep. 30, 2014, 1:22 minutes, 1 page.

Smith, Damon, "Assembling a ZipGrow Farm Wall," Upstart University, https://www.slideshare.net/BrightAgrotech/assembling-a-zipgrow-farm-wall, Sep. 21, 2015, 40 slides.

Storey, Amy, "The Evolution of the ZipGrow Farm Wall Design," https://blog.brightagrotech.com/the-evolution-of-the-zipgrow-farm-wall-design/, Jul. 23, 2015, 10 pages.

Storey, Amy, "The Many Benefits of Living Walls," https://blog.brightagrotech.com/the-many-benefits-of-living-walls/, Jun. 12, 2015, 13 pages.

(56) References Cited

OTHER PUBLICATIONS

Storey, Amy, "What Happens When Restaurants Become Urban Farms?," https://blog.brightagrotech.com/what-happens-when-restaurants-become-urban-farms/, Sep. 30, 2015, 6 pages.

Storey, Nate, "How Do Green Walls Work?," Bright Agrotech, https://youtu.be/y_DXn4YdkBQ, Aug. 15, 2013, 5:22 minutes, 1 page.

Storey, Nate, "World's First Aquaponic Living Green Wall," Bright Agrotech, https://youtute/zO_GeRDU2x0, Aug. 13, 2013, 5:40 minutes, 1 page.

* cited by examiner

GREENWALL CLADDING

CROSS REFERENCE TO RELATED APPLICATIONS

This application is a divisional of and claims the benefit of priority to U.S. application Ser. No. 15/513,984, filed on Mar. 23, 2017, which claims the benefit of Patent Cooperation Treaty Application No. PCT/US2015/052166, filed on Sep. 25, 2015, which claims priority to U.S. Provisional Application No. 62/057,328 filed Sep. 30, 2014, the entire contents of all of these applications are incorporated herein by reference for all purposes.

BACKGROUND

Traditional hydroponics has focused primarily on horizontal production techniques and has been subject to major space constraints. Vertical hydroponic applications have either been impractical, expensive to operate, or inefficient. Often these applications utilize some type of growth medium that is heavy when saturated, causing clogging when filled with plant roots, and/or requiring a great deal of maintenance. In addition, conventional technology makes it difficult to allow in-store display of live, growing vegetables and is not conducive to "you-pick" vegetable and herb sales to customers. Little technology exists that allows vertical plant displays that are highly scalable.

The foregoing examples of related art and limitations related therewith are intended to be illustrative and not exclusive, and they do not imply any limitations on the inventions described herein. Other limitations of the related art will become apparent to those skilled in the art upon a reading of the specification and a study of the drawings.

SUMMARY

The following embodiments and aspects thereof are described and illustrated in conjunction with systems, tools and methods, which are meant to be exemplary and illustrative, not limiting in scope.

An embodiment of the present invention comprises a hydroponic cladding system comprising: two or more T members; one or more Y members; and a collection gutter; wherein a first end of the one or more Y members is placed in the collection gutter and a first end of the two or more T members are placed in the collection gutter; the Y member is placed between the two or more T members with the two T members partially covering the mouth of the Y member to create a slot between the two T members; wherein the two T members and the Y member create a grow chamber between the two T members and the Y member; and a media material insertable into the grow chamber.

Another embodiment of the present invention comprises a method for producing organisms on a greenwall cladding structure, the method comprising: providing two or more T members; providing one or more Y members; and providing a collection gutter; inserting the two or more T members and the one or more Y members into the collection gutter, wherein the one or more Y members is placed between the two or more T members and a grow chamber is created and wherein a slot is formed between the two or more T members; inserting a media material into the grow chamber; inserting one or more organisms into the media material in the grow chamber; and growing one or more organisms on the media material.

The summary above is a list of example implementations, not a limiting statement of the scope of the embodiments of the invention.

BRIEF DESCRIPTION OF THE FIGURES

The accompanying figures, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

Embodiments of the present disclosure include various apparatus, systems and methods for the germination, growth and/or harvesting of organisms, including but not limited to, various forms of plants (including but not limited to pteridophytes, gymnosperms and angiosperms, such as annual and perennial ornamental plants, vegetables, including leafy greens, brassicas, tomatoes) and fungi on greenwall cladding systems or elongated vertical cladding surfaces, including but not limited to internal and external walls of structures such as houses, offices, warehouse and outbuildings.

Figure 1:
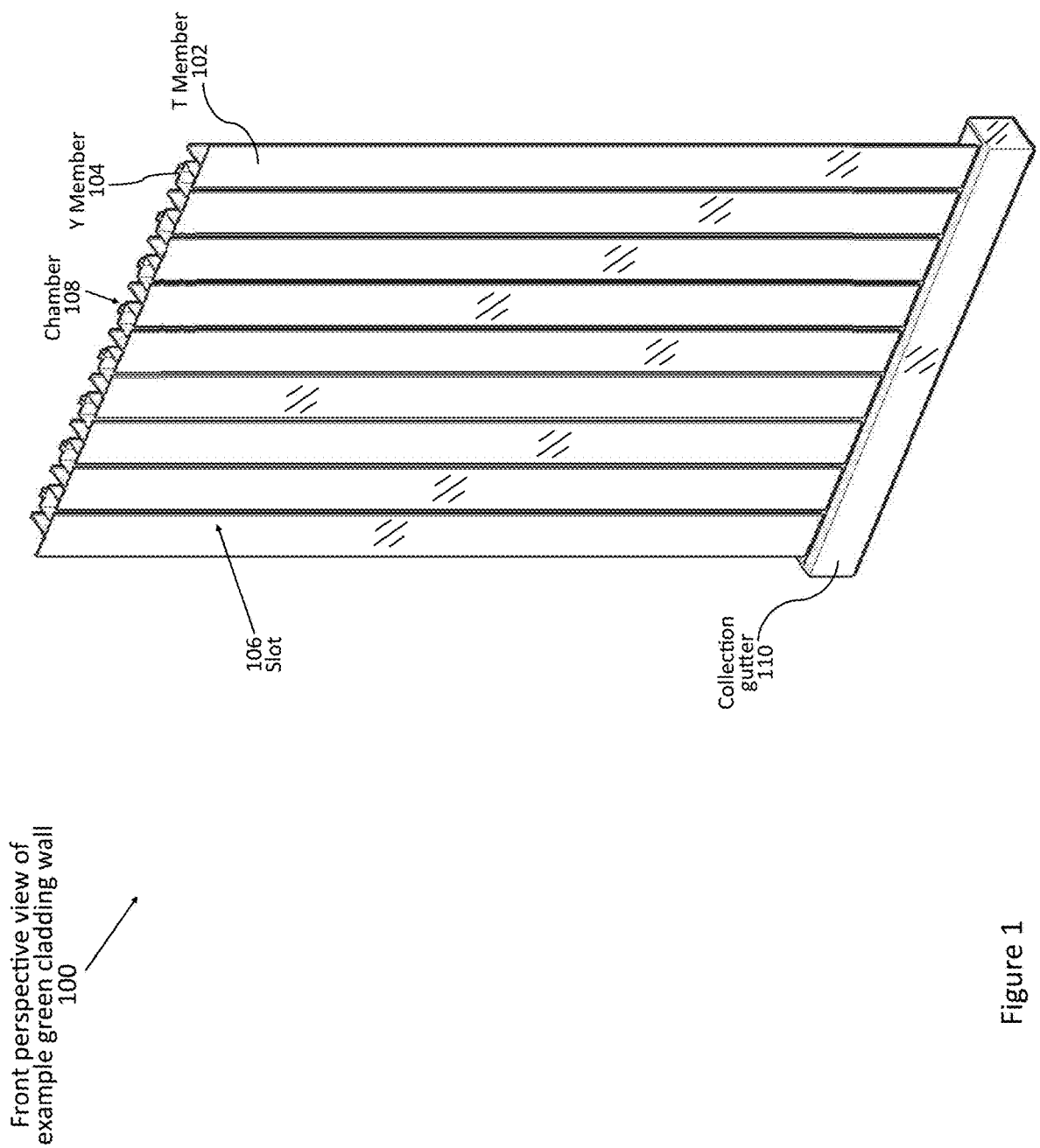
FIG. 1 is a perspective view illustrating an example of the front of a green cladding wall.

FIG. 1 provides a front perspective view of an example greenwall cladding system of the present disclosure 100. As shown in FIG. 1, the cladding system comprises two or more T members 102, one or more Y members 104 and a trough or a collection gutter 110.

As shown in FIG. 1, the two or more T members 102 are each an elongated structure which may be constructed of metal such as steel or aluminum, as well as other materials such as but not limited to plastic, wood or concrete and may be cut to a specific length, depending on the size of the walled structure the system will be affixed. The T member 102 has a wide flange facing outward. As will be understood by one skilled in the art, the elongated face or surface of the T member wide flange 102 may be provided with various surface shapes, including but not limited to, a flat face, rounded, concave convex or angular. In the example system 100 shown in FIG. 1, nine (9) T members are illustrated but any number of two or more T members 102 can be used to create the greenwall cladding system of the present disclosure. Therefore, while this descriptive example has nine T members 102, it should be understood that this description is applicable to any such system with other numbers of T members, as will be understood by one skilled in the art, once they understand the principles of this invention.

Figure 2:
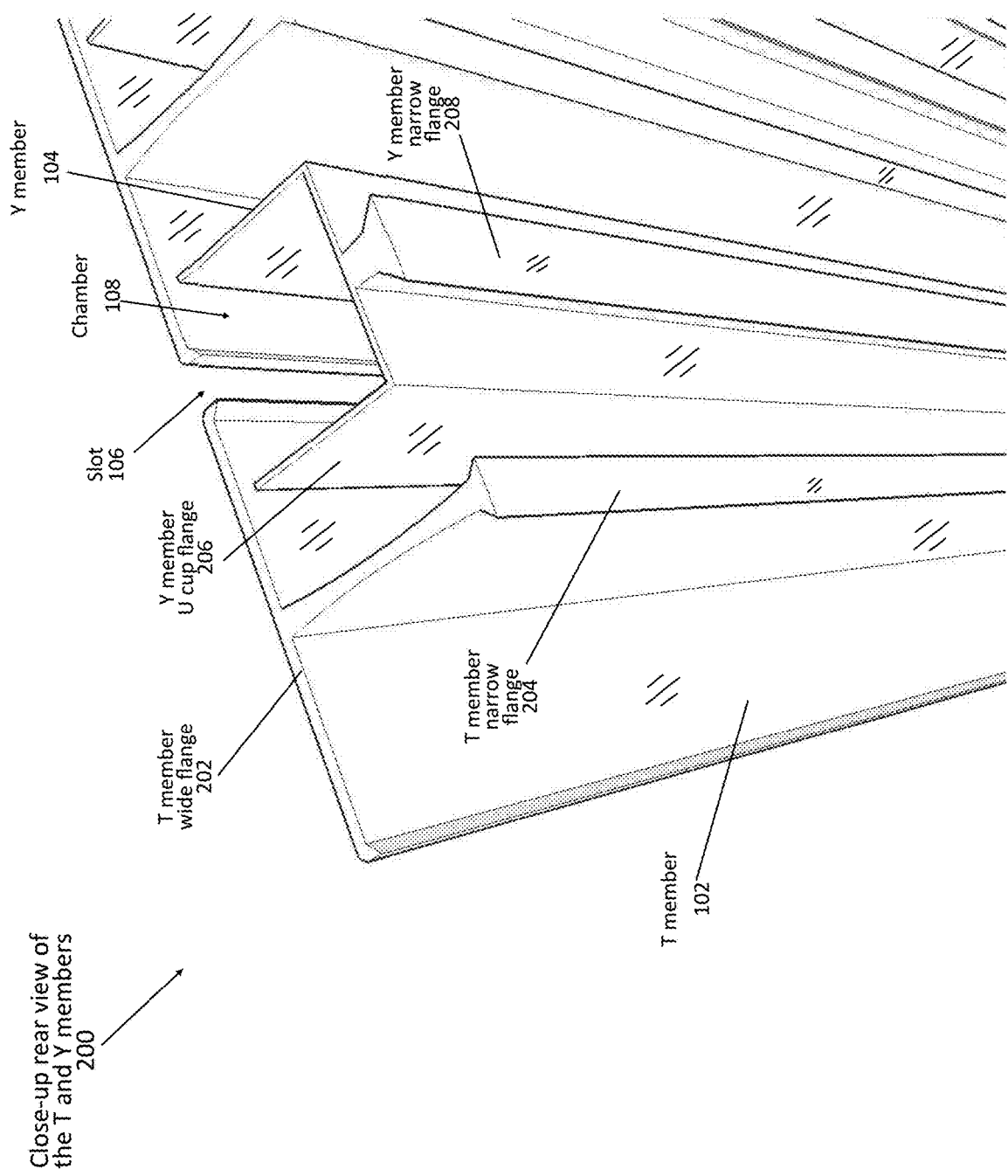
FIG. 2 is a close-up perspective view illustrating an example of the top of the T and Y members from the rear of the green cladding wall.

The one or more Y members 104 are each an elongated structure with an opening running the length of the Y member (shown in FIG. 2 as the Y member U cup 206). The Y member 104 may be constructed of metal such as steel or aluminum, or other materials such as wood, plastic or concrete and may be cut to a specific length, depending on the size of the walled structure the system will be affixed. In the example system 100 shown in FIG. 1, eight (8) Y members 104 are illustrated but any number of one or more Y members 104 can be used. Therefore, while this descriptive example has eight Y members 104, it should be understood that this description is applicable to any such system with other numbers of Y members, as will be understood by one skilled in the art, once they understand the principles of this invention.

As shown in FIG. 1 and shown in further detail in FIGS. 2 to 5, each T member 102 is placed length wise with the wide flange of the T member facing outward, away from the wall of a structure. The narrow flange or reverse end of the T member 102 is operably coupled to the wall of a structure such as an internal wall or an external wall. A variety of methods are available to operably couple the narrow flange of the T member to the structure, which are known in the art, including but not limited to, operably coupling each T member to the outer wall by sliding the narrow flange of the T member into a groove or slot either cut into the wall or attached to the wall. Additional methods for attaching or mounting the T member to a structure may include but is not limited to, pins that snapped into place on the structure, clips, including z-clips, and architectural anchors as well as various forms of adhesives depending on the building code and the expected use.

As shown in FIG. 1 and shown in further detail in FIGS. 2 to 5, each Y member 104 is placed lengthwise and is also operably coupled to a walled structure, so that the center or middle of the opening of the Y member U cup, is lined up with the slot 106 formed between the two T-members 102. A variety of methods are available to operably couple the narrow flange of the Y member to the structure, which are known in the art, including but not limited to, operably coupling each Y member to the outer wall by sliding the narrow flange of the Y member into a groove or slot either cut into the wall or attached to the wall. Additional methods for attaching or mounting the Y member to a structure may include but is not limited to, pins that snapped into place on the structure, clips, including z-clips, and architectural anchors as well as various forms of adhesives depending on the building code and the expected use.

As also shown in FIG. 1, the bottom or first end of the two or more T members 102 and first end of the one or more Y members 104 rest in a collection gutter or trough 110 that captures excess water or nutrient solution that runs through chambers 108 created in the spaces between the T members 102 and the Y members 104. The water or excess solution may then be pumped to a storage tank (not shown in FIG. 1). The storage tank may hold the water/solution used in the greenwall cladding and may house a pump that moves water from the tank to the top of the cladding for irritation. This tank can be used to capture and store wastewater runoff from the roof of the building to be used it irrigate the green wall and reduce runoff and reduce the load on the storm water system.

In an embodiment of the present disclosure, the pump is provided and placed in the collection gutter 110 or the storage tank. The pump is operably coupled to a tube, hose or other conduit, which is capable of delivering water and nutrient solutions (such as but not limited to solutions containing nitrogen, phosphorus, potassium, iron, magnesium and zinc). The pump moves nutrient solutions and/or water through tubing from the collection gutting 110 or a storage tank to the top or second end of the T members 102 and Y members 104. A nutrient solution or water is distributed into media material inserted in the grow chamber 108, which is allowed to drip down through the media and plant roots or fungi. Some of the nutrient solution trickles down the walls of the grow chamber 108 and is captured by roots or hyphae in contact with the walls of the grow chamber 108. Excess nutrient solution drains to the bottom of the grow chamber 108 where it is drained into the collection gutter 110 and then transmitted through tubing back to the second end of the T members 102 and Y members 104 or to the storage tank. High humidity may be maintained within the grow chamber 108 due to the constant trickling/misting of nutrient solution.

FIG. 2 provides a close-up perspective view illustrating a top view of an example of the T members and Y members from the rear coming together to form the slot and grow chamber of the system 200.

As shown in FIG. 2, the two or more T members 102 are an elongated structure with a t-shaped cross section, having a top section with a T-member wide flange 202 and a bottom section with a T-member narrow flange 204.

The one or more Y members 104 are an elongated structure with a y-shaped cross section, having a bottom section with a Y member narrow flange 208 and a top section with a "cup" or flattened Y member U cup 206. The Y member U cup 206 may be a variety of shapes, including but not limited to square, round, oval, and angular.

Each Y member 104 extends from the wall outward between two or more T members 102 mounted to the wall with the two T members partially covering the mouth or opening of the U cup of the Y member 104, creating a slot 106 that extends the entire length of the cladded surface. The placement of the two T members 102 and the Y member 104 also creates a grow chamber 108 where media material is inserted to provide a stable surface/platform on which an organism such as a plant or fungal tissue is able to establish roots or hyphae and grow. The slot 106 created between the two T members 102 allows for the easy insertion of organisms such as plants and fungi into the media along the length of the structure and to grow out of media that is inserted into the grow chamber 108.

In the example system 100 and 200 shown in FIGS. 1 and 2, one slot 106 and one growth chamber 108 is shown in FIG. 2 and eight (8) slots 106 and grow chambers 108 are shown in FIG. 1, however, any number of slots 106 and grow chambers 108 may be formed in the system of the present disclosure. Therefore, while these descriptive examples have eight slots 106 and growth chambers 108, it should be understood that this description is applicable to any such system with other numbers of slots and grow chambers, as will be understood by one skilled in the art, once they understand the principles of this invention.

A variety of media material may be used with the system of the present disclosure. Examples of media that may be used in the system of the present disclosure may include but is not limited to, a fibrous, non-woven matrix media material, granular materials, Styrofoam, polyurethane foam, plastic mesh, rock wool, coconut fiber, vermiculite, wicking strips, cultivar bags, as well as organic soil such as potting soil.

In an example embodiment, media of the present disclosure may be a single, fibrous, non-woven matrix media material composed of a variety of materials including plastic, such a polyester matrix material cut to a diameter that allows for easy insertion of the material into the grow chamber 108 of the system. In another embodiment, the media material may be coated in a silicone binder. In one embodiment, the single piece of media material may be cut into strips the width of the diameter of the grow chamber 108. The individual strips of media material may then be folded and pulled into this grow chamber 108 at the top of the chamber 108 of the cladded wall, with seedlings or fungi sandwiched in the fold between the two halves of the media material and corresponding to the location of the slot 106 running the length of the face of the two T members 102. As the media is pulled into the grow chamber 108, more seedlings or fungi are added, and as the media enters the grow chamber 108, the shoots of the seedlings or hyphae extend out horizontally and travel down this slot between the two T members 102. Multiple media inserts may be added to the grow chamber 108, until the media encompasses the entire length of the grow chamber 108.

The media material of the present disclosure can also be altered in several ways to serve a diverse range of functions. The media may be cut at a taper from the unfastened or unfolded end to the fastened or folded end, reserving a tapered space at the rear of the insert to allow compost, alternate plant media, fertilizing substance or some type of soil amendment or additive to be held in the space between the tapered media insert and the rear and sidewalls of the grow chamber 108. This alteration allows compost based hydroponic growth using regular irrigation water, with plant nutrients supplied by the compost or other additive. Tops, sides, and corners of the media material can also be cut, rounded, or cut at an angle to reduce biosolids accumulation, algal growth, or to enhance water distribution through the media, depending on application. Multiple inserts can also be used in the grow chambers 108 allowing multiple age groups of plants and fungi to incorporate into each grow chamber. Worms are also commonly integrated into the grow chambers and the media is designed to have the correct mesh size to accommodate their movement through the media, although media with a smaller or larger mesh size may be used depending on application.

For planting, seedlings or fungal tissue are placed between the two halves of media in each grow chamber 108 of the system, with the upper portions of the plant or organism protruding through the slot 106 between the two T members 102.

In a further embodiment, the media material is folded in half, and a pulling hook with a flat hook attached to a handle allows the media inserts to be pulled into and out of the grow chamber 108 by means of the slot 106, with the pulling hook handle extending from the slot 106 in the grow chamber 108 between the two T members 102. In a further embodiment, the hook can also be attached to a pneumatic or hydraulic device that allows automated "pulling" of the media inserts.

As shown in FIG. 2, the top of the system may be open or contained. Piping for irrigation purposes (not shown in FIG. 2) may be provided that sends water and nutrients the top of each grow chamber 108 and the media and seedlings. When the top of the system is open, rain and other moisture can trickle down the chamber 108 and through the media material.

Figure 3:
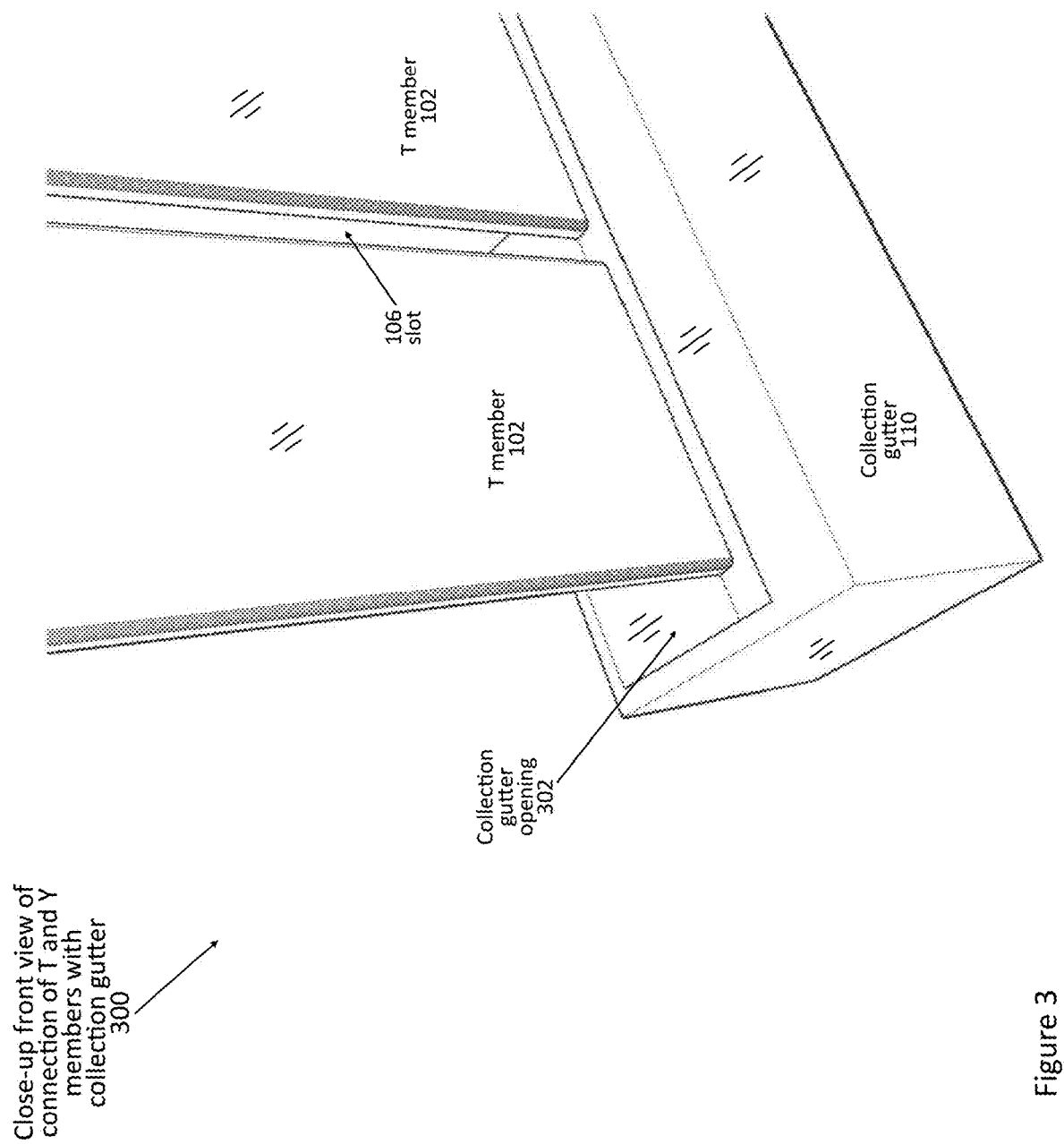
FIG. 3 is a close-up perspective view illustrating an example connection of T and Y members with a collection gutter as viewed from the front of the green cladding wall.

FIG. 3 provides a close-up, front perspective view illustrating an example of the T members and Y members coming in the together in the collection gutter of the system 300.

As shown in FIG. 3, the bottom portions or first end of the two or more T members 102 and first end of the Y member 104 (not shown in FIG. 3) of the system rest in an opening 302 formed in the collection gutter or trough 110. The opening is formed in such a manner that allows the collection gutter 110 to capture excess water that flows through the media in the grow chambers.

In an embodiment, the collection gutter 110 captures excess water or solution and returns it to a storage tank (not shown in FIG. 3). This storage tank holds the water/solution used in the greenwall cladding system of the present disclosure and houses a pump that moves water from the tank to the top portion or second end of the T members 102 and the Y members 104 for irrigation of the organisms growing in the media material inserted in the grow chamber. The storage tank may be used, when appropriate, to capture and store wastewater runoff from the roof of the building to be used to irrigate the green wall and reduce runoff and reduce the load on the storm water system.

A means of irrigation, such as a pump operably coupled to a pipe, hose or other conduit which is capable of delivering water and nutrient solutions (such as but not limited to solutions containing nitrogen, phosphorus, potassium, iron, magnesium and zinc), may also be provided, which allows water or nutrient solutions to be transported from the storage tank, to the second end of the T members 102 and Y members 104, by running the means of irrigation, such as a pipe along the top of the T members 102 and Y members 104. The water or nutrient solution may be emitted from the means of irrigation by a variety of emitters, including drip emitters, sprinklers and micro-spray emitters.

In another embodiment, the opening 302 of the collection gutter 110 may be covered by a decorative grate set in a plastic or metal drain.

Figure 4:
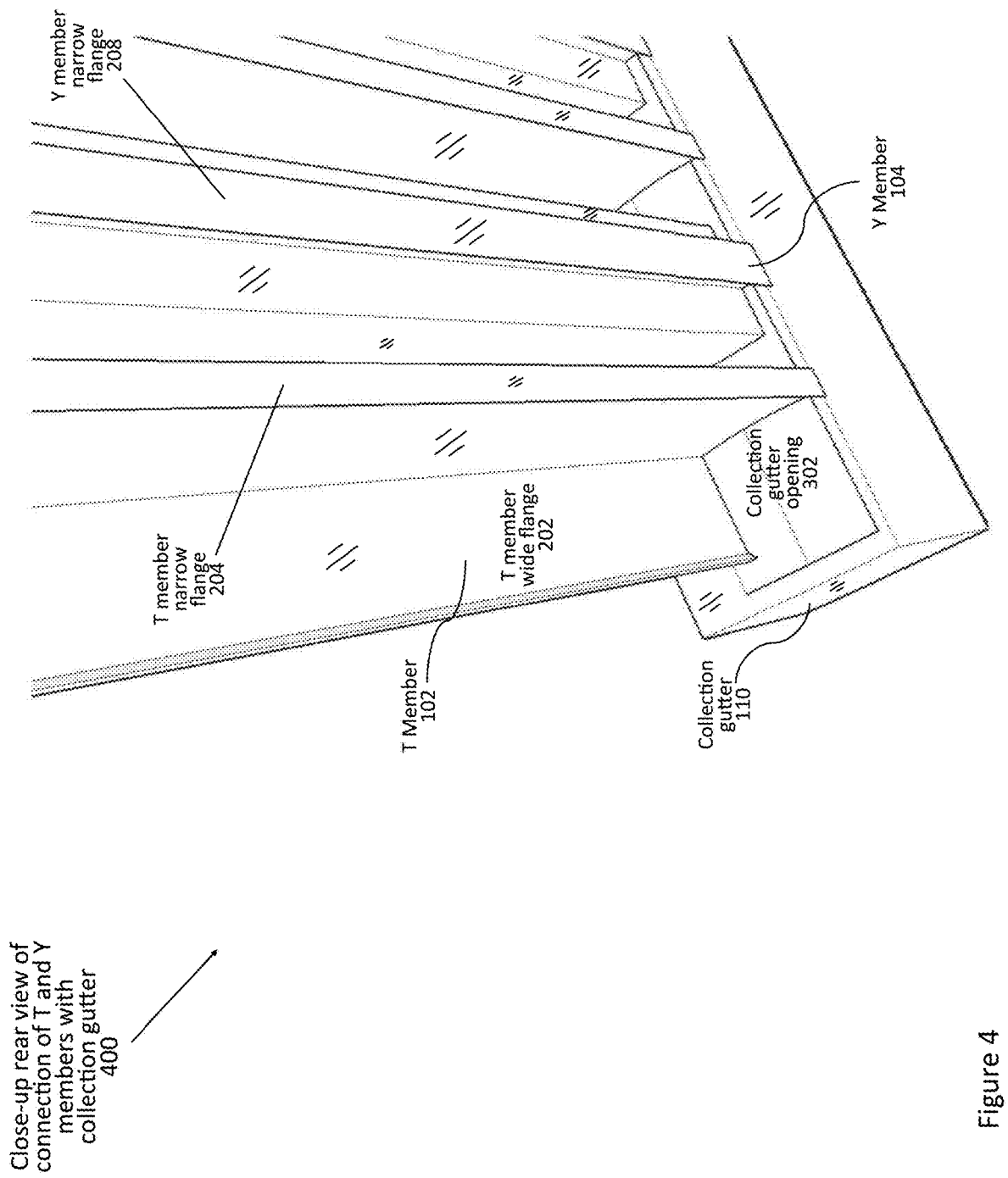
FIG. 4 is a close-up perspective view illustrating an example connection of T and Y members with a collection gutter as viewed from the rear of the green cladding wall.

FIG. 4 is a close-up rear perspective view, illustrating an example connection of T and Y members with a collection gutter from the rear of the greenwall cladding, 400.

As shown in FIG. 4, the bottom portions of the two or more T members 102 and the Y member 104 of the system rest in an opening 302 formed in the collection gutter 110. As previously discussed, the opening is formed in such a manner that allows the collection gutter 110 to capture excess water that flows through the media in the grow chambers.

Figure 5:
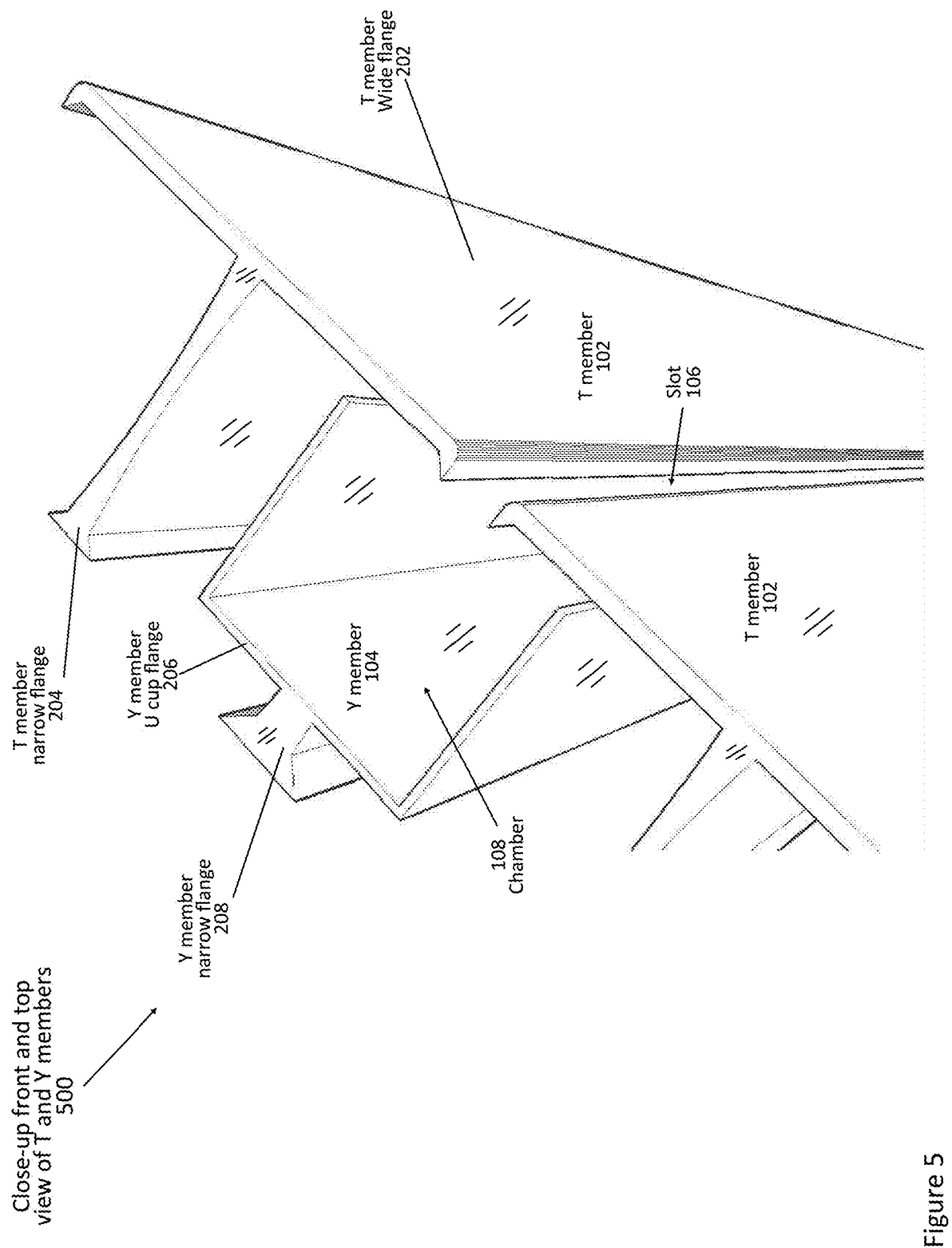
FIG. 5 is a close-up perspective view illustrating an example of the front and top of the T and Y members of the green cladding wall.

FIG. 5 is a close-up perspective view illustrating an example front view of the T and Y members as well as the slot and chamber openings, 500.

As shown in FIG. 5, and previously discussed in FIG. 2, each Y member 104 extends from the wall outward between two or more T members 102 mounted to the wall with the two T members partially covering the mouth of the Y member 104. The opening between the two T members creates a slot 106 that extends the entire length of the structure and provides a space for plants or other organisms to be inserted into the media material inserted within the chamber. The chamber 108, where media material is inserted is created by the placement of the two T members 102 and the Y member 104.

Figure 6:
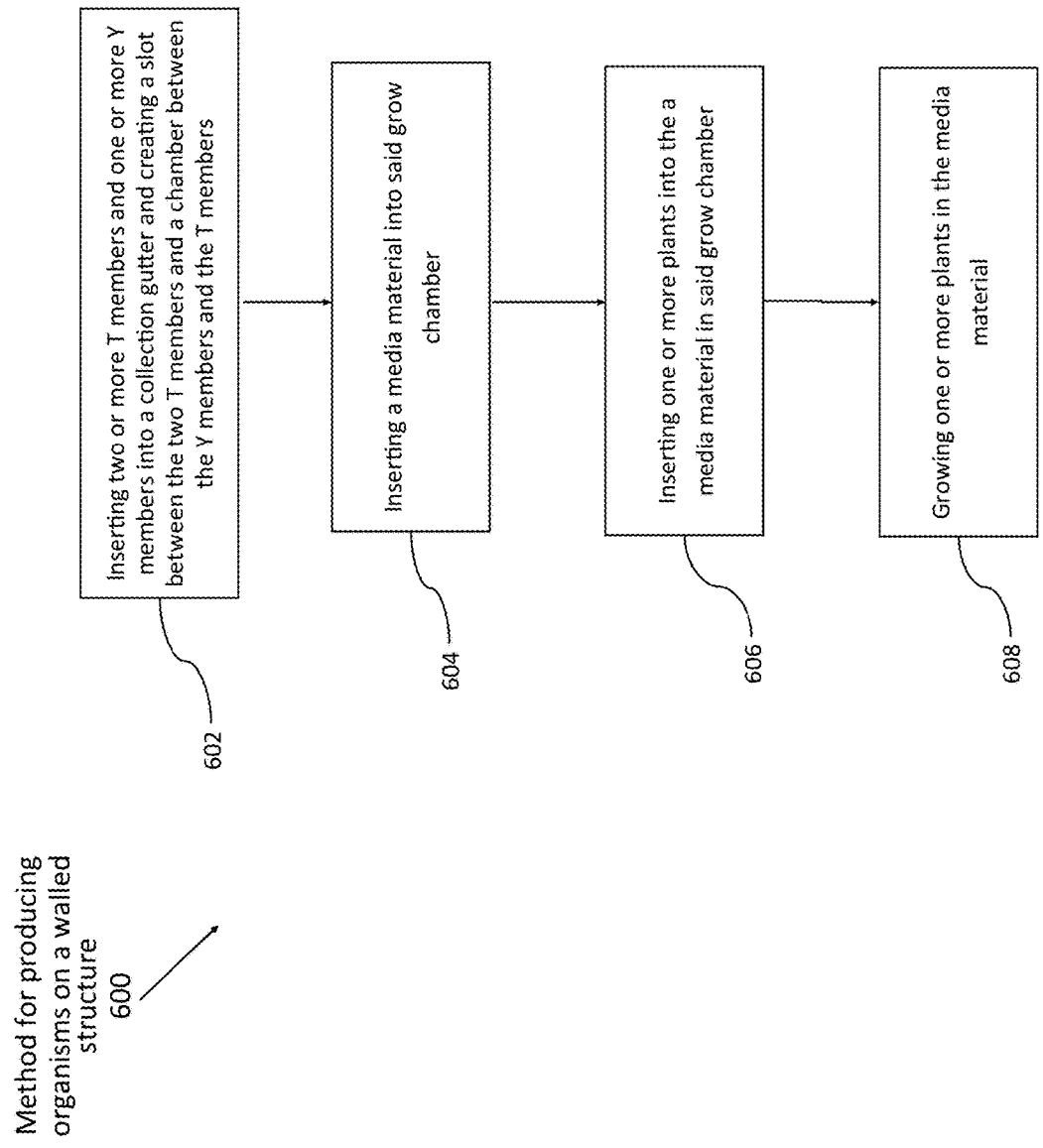
FIG. 6 provides a flow diagram of the method for producing organisms on a walled structure.

FIG. 6 provides a flow diagram of the method for producing organisms on a walled structure, 600. In step 602, two or more T members and one or more Y members are inserted into a collection gutter in order to create both a slot between the two T members and a grow chamber between the Y members and the T members. In step 604, media material, such as one piece strips of non-woven polyester, are folded in half to create two halves and inserted into the grow chamber. In step 606, one or more plants or fungi are then inserted into the slot between the two T members and into the slot between the two halves of media material. In step 608, the one or more plants are grown in the media material. Nutrients may be pumped to the top of the media material and allowed to drip down through the media where the plants may update the nutrients as needed. Any remaining nutrients may then be collected in a collection gutter located at the bottom of the grow chamber, where the nutrients may then be recycled back to the plant.

Currently there is no equipment available that functions as both a clean and attractive cladding and greenwall product as the system disclosed herein. Typically products are dedicated products, requiring the architects and building owners to decide whether they want a greenwall or a standard industrial cladding product. The greenwall cladding system provides both a greenwall and an industrial cladding system, with the option to change the system as needed. Moreover, the system provided herein allows for the use of lightweight media with very little water holding capacity, allowing heavy, water-holding traditional medias to be replaced with a lightweight media and constant circulation. This dramatically reduces the cost of the system, the cost of the install and the cost of operation.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for producing organisms on a walled structure, the method comprising:
   providing at least one grow chamber comprising:
   providing two T members, wherein said two T members have a first end and a second end;
   providing a Y member, wherein said Y member have a first end and a second end; and
   providing a collection gutter;
   inserting said first end of said two T members into said collection gutter, wherein said two T members are configured to create a slot between the two T members;
   inserting said first end of said Y member into said collection gutter and configuring said Y member between said two T members,
   aligning the opening of the Y member with the slot between the two T members, and wherein said two T members and said Y member create said grow chamber between said two T members and said Y member;
   providing a media material and inserting said media material into the grow chamber;
   providing one or more organisms and inserting said one or more organisms into the media material through the slot formed between the two T members; and
   growing said one or more organisms on said media material.

2. The method of claim 1, further comprising:
   attaching said two T members and said Y member to a walled structure.

3. The method of claim 2, wherein said walled structure is chosen from an external wall of a building or an internal wall of a building.

4. The method of claim 1, wherein said two T members comprise a wide flange face and a narrow flange, wherein the narrow flange of said two T members is operably coupled to said structure.

5. The method of claim 1, wherein said one Y member comprises a U shaped section and a narrow flange, wherein said narrow flange is operably coupled to said structure.

6. The method of claim 1, further comprising a means of irrigation, wherein said means of irrigation comprises:
   providing at least one pump;
   providing a conduit capable of transporting water or liquid nutrients from said collection gutter, wherein said conduit is operably coupled to said at least one pump; and
   providing at least one emitter coupled to the second end of said at least one Y member;
   wherein said pump transports water or liquid nutrients from said collection gutter through the conduit and delivered to said media material through said at least one emitter.

7. The method of claim 6, further comprising:
   providing a storage tank, wherein said pump transports nutrient solution from the storage tank into the grow chamber through tubing.

8. The method of claim 1, wherein said media material is a fibrous, non-woven matrix media material composed of two halves or one piece.

9. The method of claim 8, wherein said media material is made of plastic.

10. The method of claim 9, wherein said media material is made from a polyethylene plastic.

11. The method of claim 10, wherein said media material is coated with a silicone binder.

12. The method of claim 1, wherein said media material is an organic soil media.

13. The method of claim 1, wherein said media material is chosen from: granular media, Styrofoam, polyurethane foam, plastic mesh, rock wool, coconut fiber, wicking strips, cultivation bags and vermiculite.

14. The method of claim 1, wherein the surface of said wide flange of the T member is chosen from flat, concave, convex or angular.

15. The method of claim 1, wherein the shape of said U cup of the Y member is chosen from square, round, oval, and angular.

16. The method of claim 1, wherein said organisms are selected from plants and fungi.

17. The method of claim 6, wherein said emitter is selected from a drip emitter, sprinkler and micro-spray emitters.

18. The method of claim 2, wherein said T member is operably coupled to said structure by a means chosen from pins, clips, and architectural anchors.

19. The method of claim 2, wherein said Y member is operably coupled to said structure by a means chosen from pins, clips, and architectural anchors.

* * * * *